United States Patent [19]

Okoshi

[11] Patent Number: 4,589,857
[45] Date of Patent: May 20, 1986

[54] CONSTANT VELOCITY UNIVERSAL JOINT

[75] Inventor: Hideo Okoshi, Fujisawa, Japan

[73] Assignee: Nippon Seiko Kabushiki Kaisha, Tokyo, Japan

[21] Appl. No.: 698,864

[22] Filed: Feb. 6, 1985

[30] Foreign Application Priority Data

Feb. 28, 1984 [JP] Japan .................................. 59-35390

[51] Int. Cl.⁴ ................................................. F16D 3/23
[52] U.S. Cl. ....................................... 464/145; 464/906
[58] Field of Search ................................. 464/145, 906

[56] References Cited

U.S. PATENT DOCUMENTS

| 2,046,584 | 7/1936 | Rzeppa | 464/145 |
| 3,879,960 | 4/1975 | Welschof et al. | 464/145 |
| 3,982,840 | 9/1976 | Grosseau | 464/145 X |
| 4,319,465 | 3/1982 | Ito et al. | 464/145 |
| 4,331,005 | 5/1982 | Hirai et al. | 464/906 X |

FOREIGN PATENT DOCUMENTS 2097513 11/1982 United Kingdom ................. 464/145

Primary Examiner—John M. Jillions
Assistant Examiner—Daniel P. Stodola
Attorney, Agent, or Firm—Shapiro and Shapiro

[57] ABSTRACT

A constant velocity universal joint comprises an outer member having an inner partial concave spherical surface with a plurality of lengthwise grooves therein, an inner member inserted in the outer member and having an outer partial convex spherical surface with a plurality of lengthwise grooves therein, a plurality of balls retained in corresponding opposed pairs of the grooves of the two members and serving to transmit a torque between the two members, and a cage disposed between the two members for receiving the balls. The bottoms of the grooves of the two members are arcuate, the grooves of each member having a respective arc center. The arc centers are offset by substantially equal amounts to opposite sides of the central plane of the joint, and the spherical centers of the inner and outer spherical surfaces are also offset by substantially equal amounts to opposite sides of the central plane. The amount of offset of the spherical centers is smaller than that of the arc centers, with both offsets being smaller than the distance between the central plane of the joint and the end face of the outer member.

4 Claims, 2 Drawing Figures

CONSTANT VELOCITY UNIVERSAL JOINT

BACKGROUND OF THE INVENTION

1. Field of the Invention

This invention relates to improvements in a so-called Rzeppa type uniform universal joint which is provided with an outer member, an inner member, a plurality of balls retained in each opposed pair of a plurality of arcuate grooves formed lengthwise in the inner and outer surfaces of the two members for transmitting a torque between the two members, and a cage receiving the balls, and in which the centers of the arcs of the bottoms of the arcuate grooves of the two members are offset by substantially equal amounts on the opposite sides of the central plane of the joint. The invention is particularly concerned with a constant velocity universal joint suitable for mass production and having increased strength when the joint angle is large, while avoiding adverse effects when the joint angle is small, thereby prolonging the life of the joint.

2. Description of the Prior Art

In the recent years, FF of passenger cars have sharply progressed, and especially there is a tendency that four-wheel drive vehicles are increasing, in number. With the increasing demand for four-wheel drive vehicles, constant velocity universal joints operable at a large joint angle and high in strength and durability have become desired. Where the joint angle is large, that is, where the joint is bent greatly, there occur differences between the loads borne by the balls for transmitting a torque, and the load of a given ball my be substantially increased. Therefore, the forces exerted on the pockets of the cage become non-uniform and in conventional joints, this may cause the pocket portion of the cage to crack and flaking to occur near the shoulders of the grooves of the inner member which are adjacent to that side on which the groove wedge is narrow, moreover brinelling may be caused in the same region by a shock torque so as to cause abnormal noises and in addition, the balls can contact the corners of the pockets of the cage to create an edge load which may damage the balls or may deform and break down the corners of the pockets. The groove wedge refers to the angle formed by the bottoms of the lengthwise grooves formed in the outer and inner members.

An example of a device intended to overcome such disadvantages is the device of Japanese Utility Model Publication No. 53148/1981, but in this device, the centers of the spheres of the inner and outer spherical surfaces of the outer and inner members and the centers of the arcs of the bottoms of the lengthwise grooves are all offset by equal amounts. Therefore, the grooves are shallow at the small joint angle operation which is frequently used. Also, this leads to a short life, and the thickness of the cage is very large on that side on which the groove wedge is great, as will later be described, and therefore, the press work of the pocket has been difficult and the yield of the material is low. Thus this device has been unsuitable for mass production and has been costly.

SUMMARY OF THE INVENTION

The present invention solves the above-noted various problems by making the amount of offset of the inner and outer spherical surfaces of the two members smaller than the amount of offset of the bottoms of the grooves.

DESCRIPTION OF THE PREFERRED EMBODIMENTS

Figure 1:
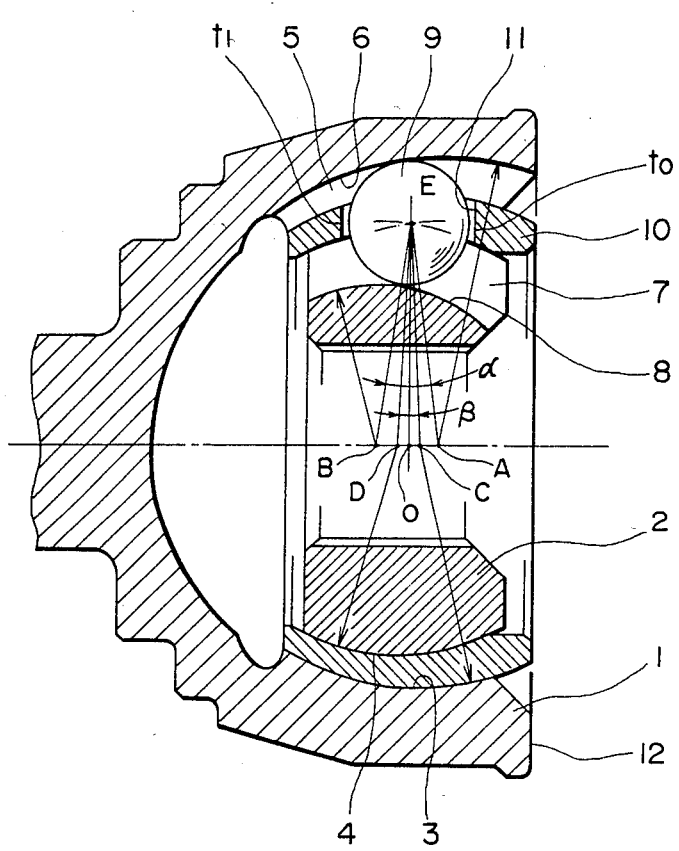
FIG. 1 is a longitudinal cross-sectional view showing the essential portions of an embodiment of the present invention.

The present invention will hereinafter be described with respect to embodiments thereof shown in the drawings. In FIG. 1, the inner peripheral surface of an outer member 1 is a partial concave spherical surface 3 and the center of the sphere is a point C on the axis of the outer member 1. An inner member 2 is inserted in the interior of the outer member 1, and the outer peripheral surface of the inner member 2 is a partial convex spherical surface 4 centered at a point D on the axis of the inner member 2. The centers C and D of the spheres are offset by substantially equal amounts to the left and right of the central plane $\overline{OE}$ of the joint, as shown. E is the center of a ball 9 which will later be described. A plurality of grooves 5 are formed lengthwise in the inner peripheral surface 3 of the outer member 1. The bottom 6 of each groove 5 is of arcuate shape with an arc center A on the axis of the outer member 1 and situated outside the center C of the spherical surface 3, as shown. A plurality of grooves 7 are also formed lengthwise in the outer spherical surface 4 of the inner member 2. The bottom 8 of each groove 7 is of arcuate shape with an arc center B on the axis of the inner member 2 and situated outside the center D of the spherical surface 4, as shown. The center A of the arc of the bottom 6 of each groove 5 of the outer member is inside the opening end face 12 of the outer member 1, and the centers A and B of the arcs of the bottoms of the grooves of the two members are offset by substantially equal amounts to the left and right of the central plane $\overline{OE}$ of the joint. Each pair of grooves 5 and 7 cooperate to form a ball groove in which the ball 9 can roll lengthwise.

The balls 9 are held in a plurality of ball pockets 11 provided in the outer shell of a cage 10 disposed between the inner and outer spherical surfaces 3 and 4 of the outer member 1 and the inner member 2, respectively. One ball is retained in each opposed pair of grooves 5 and 7 and serves to transmit a torque between the outer member 1 and the inner member 2. The cage 10 is of a partially spherical shell shape and has inner and outer spherical surfaces respectively complementary to the sperhical surfaces 4 and 3. Thus the spherical centers of the inner and outer cage surfaces are substantially coincident with the aforementioned points D and C, respectively.

The constant velocity universal joint according to the above-described embodiment is of the so-called Rzeppa type in which the centers A and B of the arcs of the bottoms of the grooves of the two members are offset. In accordance with the invention the centers C and D of the inner and outer spherical surfaces of the two members are also offset and the amounts of offset $\overline{OC}$ and $\overline{OD}$ thereof are made smaller than the amounts of offset $\overline{OA}$ and $\overline{OB}$ of said centers A and B. In comparison with the earlier described joint of the prior art, the present joint is substantially uniform in both of the thickness of the cage 10 and the depth of the grooves 5 and 7 and thus, the previously noted problems peculiar to the prior art are eliminated. Furthermore, design and manufacture of the joint of the present invention are easier and more inexpensive than those of the joint of the prior art.

Figure 2:
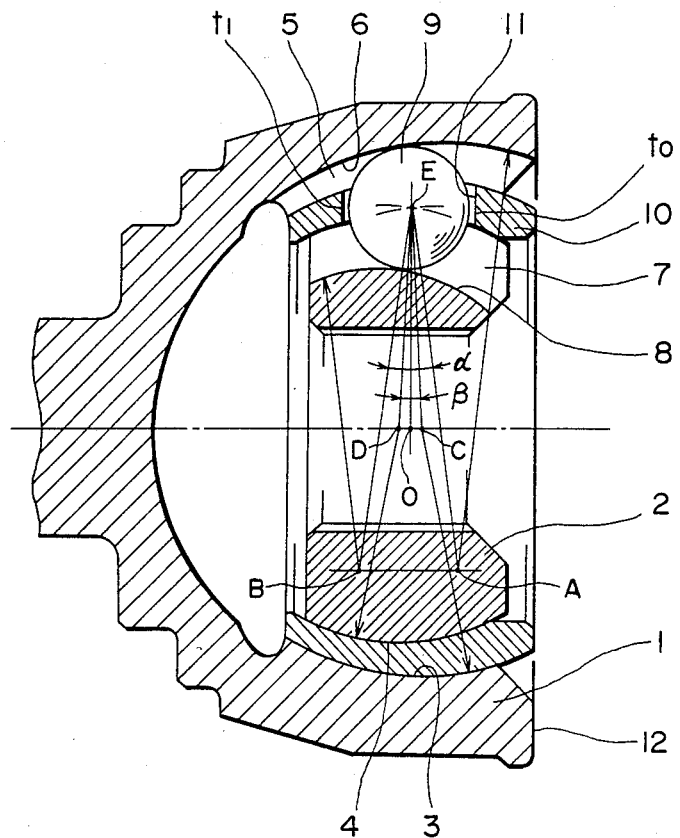
FIG. 2 is a longitudinal cross-sectional view showing the essential portions of another embodiment of the present invention.

FIG. 2 shows another embodiment of the present invention. In FIG. 2, reference numerals and symbols common to those in FIG. 1 are used. The only difference of this embodiment from the embodiment of FIG. 1 is that the center of the arc of the groove bottom 6 of the outer member is a point A at the opposite side of the axis of the outer member 1 and the center of the arc of the groove bottom 8 of the inner member 2 is situated at a point B at the opposite side of the axis of the inner member 2. In this embodiment, the depth of the opening ends of the grooves 5 of the outer member 1 and the depth of the grooves at the inner part thereof are larger than in the previous embodiment. The depth of the grooves 7 of the inner member is somewhat smaller at the entrance end and inner part thereof, but a sufficient depth for the transmission of a torque can be maintained therefore, a better effect can be expected in this embodiment than in the embodiment of FIG. 1.

In the two embodiments, as regards the relation between the wedge angle $\alpha$ at which the centers A and B of the arcs of the aforementioned groove bottoms subtend the center E of the ball 9 and the wedge angle $\beta$ at which the centers C and D of the inner and outer spheres of the two members subtend said center E, it is desirable that $\beta$ be $\frac{1}{2}$ or less of $\alpha$. It will be apparent that if $\beta$ exceeds $\frac{1}{2}$ of $\alpha$, the uniformity of the thickness of the cage 10 will be significantly reduced. Also, to achieve the object of the present invention that the strength of the cage should be increased, it is desirable that the value of said $\beta$ be 1/10 or more of said $\alpha$. Further, if the thickness of that side of the cage pocket on which the groove wedge opens is $t_0$, as shown, and the thickness at the narrower side of the groove wedge is $t_1$, it is desirable that $t_0/t_1$ be at least 1.12 to prevent the aforementioned edge load and be 1.55 or less for ease of manufacturing. The value of $\beta/\alpha$ which satisfies this condition is 1/10 to $\frac{1}{2}$. If, for example $\beta/\alpha=6/10$, said $t_0/t_1$ is 1.7. In the joint disclosed in the aforementioned Japanese Utility Model Publication No. 53148/1981, $\beta/\alpha=1$ and therefore $t_0/t_1$ amounts to 2.3. At such values of $\beta/\alpha$, the working of cage pockets in mass production of joints becomes difficult.

As is apparent from the foregoing description, the present invention provides a Rzeppa type constant velocity universal joint of novel construction which solves the earlier mentioned problems of the prior art.

I claim:

1. A constant velocity universal joint comprising an outer member having an inner peripheral surface in the form of a partial concave spherical surface with a plurality of lengthwise grooves therein, an inner member inserted in said outer member and having an outer peripheral surface in the form of a partial convex spherical surface with a plurality of lengthwise grooves therein, a plurality of balls retained in corresponding opposed pairs of said grooves of said outer and inner members and serving to transmit a torque between said outer and inner members, and a cage receiving said balls and disposed between said inner and outer spherical surfaces of said outer and inner members, respectively, characterized in that the longitudinal cross-sections of the bottoms of the grooves of said outer member are arcuate and have a first arc center and the longitudinal cross-sections of the bottoms of the grooves of said inner member are arcuate and have a second arc center, with said first and second arc centers being offset to opposite sides of a central plane of said joint by substantially equal amounts, in that said inner and outer spherical surfaces have respective spherical centers offset to opposite sides of said central plane by substantially equal amounts, in that said cage has an outer part spherical surface with a spherical center substantially coincident with that of said inner spherical surface of said outer member and an inner part spherical surface with a spherical center substantially coincident with that of said outer spherical surface of said inner member, and in that the amount of offset of the first-mentioned spherical centers is smaller than the amount of offset of said arc centers, with the distance between said central plane of said joint and an opening end face of said outer member being greater than either of said amounts of offset.

2. A constant velocity universal joint according to claim 1, wherein said spherical center of the concave spherical surface of said outer member and said first arc center are situated on the axis of said outer member and outside the central plane of said joint, and wherein said spherical center of the convex outer spherical surface of said inner member and said second arc center are situated on the axis of said inner member and inside the central plane of said joint.

3. A constant velocity universal joint according to claim 1, wherein said first and second arc centers are situated at points distant from the axes of said outer member and said inner member, respectively.

4. A constant velocity universal joint according to claim 1, wherein a wedge angle ($\beta$) at which the spherical centers of the inner and outer spherical surfaces of said outer and inner members subtend the center of a ball in said central plane of said joint is from 1/10 to $\frac{1}{2}$ of a wedge angle ($\alpha$) at which the first and second arc centers subtend the center of said ball.

* * * * *